United States Patent

Perusek et al.

[11] Patent Number: 5,462,081
[45] Date of Patent: Oct. 31, 1995

[54] EXCESS FLOW VALVE

[75] Inventors: Robert V. Perusek, Euclid; Ulrich H. Koch, Chagrin Falls; Gregory S. Kalata, Parma, all of Ohio

[73] Assignee: Nupro Company, Willoughby, Ohio

[21] Appl. No.: 295,205

[22] Filed: Aug. 24, 1994

[51] Int. Cl.⁶ .................................................. F16K 17/24
[52] U.S. Cl. .................................................. 137/498
[58] Field of Search ................................... 137/460, 498, 137/517

[56] References Cited

U.S. PATENT DOCUMENTS

| | | | |
|---|---|---|---|
| 2,245,271 | 6/1941 | Guill | 137/498 X |
| 2,353,191 | 7/1944 | Samiran. | |
| 2,900,997 | 8/1959 | Bostock. | |
| 3,561,471 | 2/1971 | Sands. | |
| 3,683,957 | 8/1972 | Sands. | |
| 3,756,272 | 9/1973 | Hammond | 137/498 |
| 3,872,884 | 3/1975 | Busdiecker et al. | 137/498 |
| 4,010,770 | 3/1977 | Peters. | |
| 4,269,223 | 5/1981 | Carter et al. | |
| 4,319,604 | 3/1982 | Bird | 137/498 |
| 4,349,042 | 9/1982 | Shimizu. | |
| 4,574,833 | 3/1986 | Custer. | |
| 4,590,962 | 5/1986 | Tespa. | |
| 4,605,039 | 8/1986 | Johnson et al. | |
| 4,630,799 | 12/1986 | Nolan et al. | |
| 4,637,427 | 1/1987 | Nolan et al. | |
| 4,809,740 | 3/1989 | Nevlud | 137/498 X |
| 4,811,756 | 3/1989 | Hall. | |
| 4,819,688 | 4/1989 | Field. | |
| 4,830,046 | 5/1989 | Holt. | |
| 5,107,679 | 4/1992 | Bartlett. | |
| 5,215,113 | 6/1993 | Terry. | |
| 5,215,178 | 6/1993 | Bartlett. | |

*Primary Examiner*—Robert G. Nilson
*Attorney, Agent, or Firm*—Fay, Sharpe, Beall, Fagan, Minnich & McKee

[57] ABSTRACT

A poppet type excess flow valve comprises a body forming a valve chamber having a first portion of a first diameter adjacent a first end and a second portion of a second smaller diameter adjacent second end. A valve seat is located between the first and second portions of the valve chamber. A poppet element is mounted in the valve chamber and includes a first section in the form of a hollow cylindrical body extending into the second portion of the valve chamber and terminating therein in an open end. The outer diameter of the hollow cylindrical body section is only slightly less than the diameter of the second portion of the valve chamber for guided sliding movement therein. The poppet element further includes a second section located in the first portion of the valve chamber and including an end wall carrying a valving surface extending radially outward for cooperation with the valve seat. A compression coil spring maintains the poppet element continually biased under a predetermined force toward the inlet port, and flow passages are formed through the hollow cylindrical body portion of the poppet element at a location closely adjacent the valving surface.

15 Claims, 1 Drawing Sheet

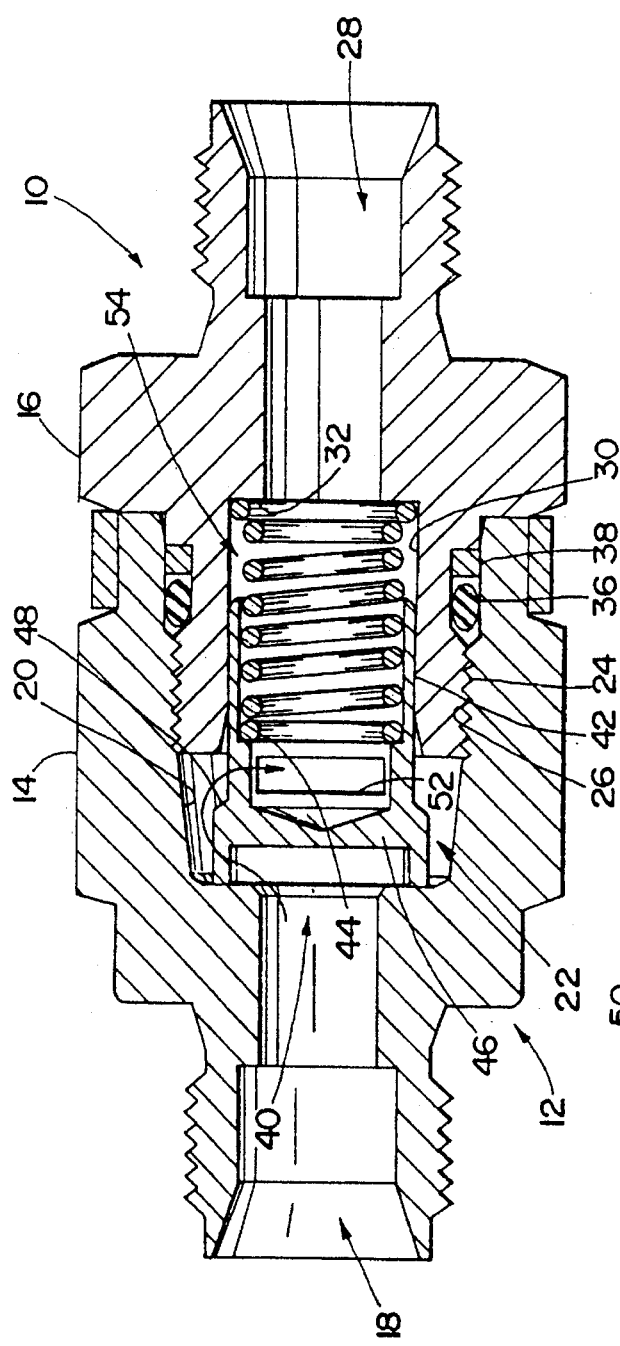
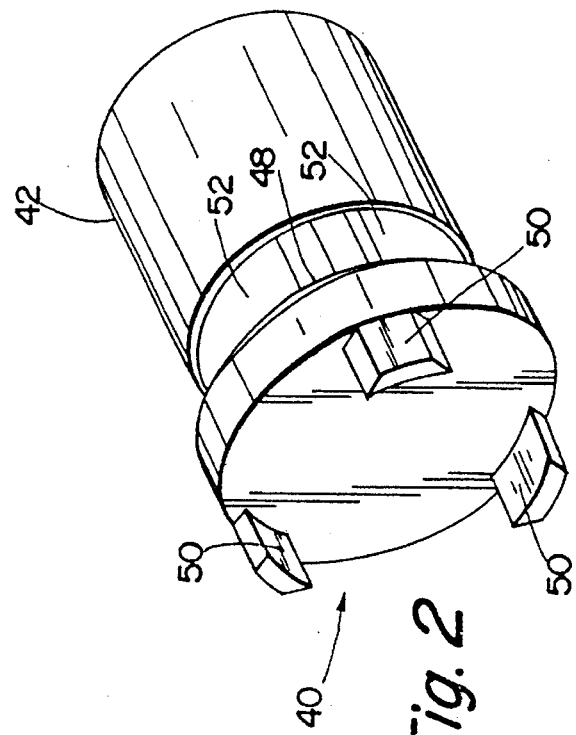
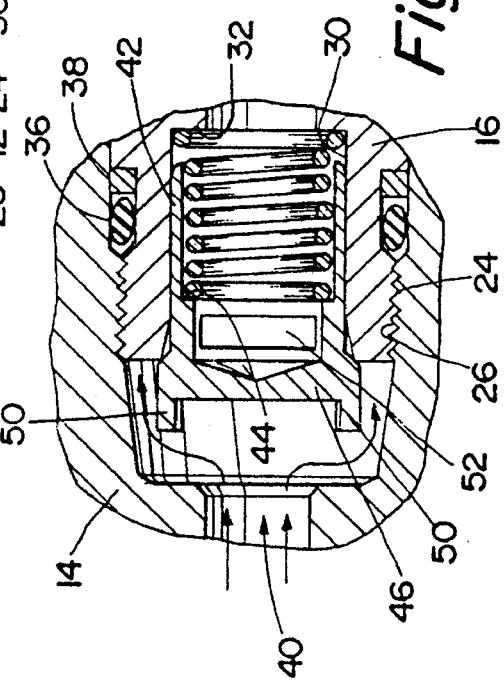

5,462,081

EXCESS FLOW VALVE

BACKGROUND OF THE INVENTION

The subject invention is directed toward the valve art and, more particularly, to a poppet-type excess flow valve.

Excess flow valves are typically used in flow systems to shut off the flow of process or system fluid whenever it exceeds a predetermined level. For example, rupture of a downstream line, or other failure of a downstream component, could result in release of large amounts of fluid. Depending on the type of fluid involved, the results could be catastrophic.

A satisfactory valve of the general type under consideration should be entirely automatic in operation and require no form of external activation. Preferably, the valve should be totally passive during proper system functioning and allow normal flow therethrough in the manner of a fixed orifice. The flow rate of the valves at the trip point should be distinctly defined and repeatable. At all flow rates up to the trip point, the valves should be stable with no flutter or chatter. In addition, the valves must, of course, be highly reliable and basically maintenance free. Moreover, they should preferably create a minimal restriction to flow during normal flow conditions.

A valve of this kind normally remains in a static condition, never moves, is never exercised, and, if all goes well, never has to trip. Therefore, in many systems such as petroleum or chemical plants, it could easily become clogged by solids, contaminants, tars, waxes, and other materials such systems typically deposit on piping walls. If the holes in the poppet gradually built up a deposit layer and became smaller, they would eventually make it trip a flow rate less than the original design value and result in false trips and the attendant maintenance costs.

While many different valves are currently in use for excess flow control, almost none can satisfactorily meet all the noted criteria in a simple and effective manner. For example, most common excess flow valves are not inherently stable because they function similarly to a simple check valve. To explain, in these known excess flow valves, the flow passes around a poppet or ball and creates a pressure drop. As the flow increases, the poppet gradually compresses a spring and moves toward a seat. At flow rates between open and close stops, the poppet is supported only by the spring and invariably chatters. The flow rate at which the poppet reaches the closed stop can vary widely and thus does not have a distinct, repeatable value.

SUMMARY OF THE INVENTION

The subject invention provides a poppet-type excess flow valve which satisfies the above criteria and which can be used in a variety of fluid systems either liquid or gas. Valves formed in accordance with the invention have a very definite and repeatable trip point with the poppet moving rapidly between the open and closed stops without chatter. In particular, a poppet-type excess flow valve according to the invention generally includes a body which forms a valve chamber having a first end defining an inlet port and a second end defining an outlet port. The valve chamber has a first portion of a first diameter adjacent the first end and a second portion of a second smaller diameter adjacent the second end. Between the first and second portions of the valve chamber is a circumferentially extending valve seat. Positioned in the valve chamber is a poppet element which includes a first section in the form of a hollow cylindrical body that extends into the second portion of the valve chamber and terminates therein in an open end. The outer diameter of the hollow cylindrical body section is only slightly less than the diameter of the second portion of the valve chamber such that it has guided sliding movement therein. The poppet element further includes a second section located in the first portion of the valve chamber and joined to the first section. Included in the second section of the poppet is an end wall that carries a circumferentially continuous valving surface that extends radially outward to a diameter greater than the diameter of the second portion of the valve chamber for cooperation with the valve seat. A compression coil spring is closely received in the hollow first section of the poppet element and extends out of the open end into engagement with the valve body about the outlet port. The compression coil spring is arranged for maintaining the poppet element continually biased under a predetermined force toward the inlet port with the valving surface spaced from the valve seat. Flow passages are formed through the hollow cylindrical body portion of the poppet element at a location closely adjacent the valving surface of the second section. The size of the flow passages is related to the predetermined force of the coil spring to permit a predetermined maximum flow through the flow passages after which the force of the coil spring is overcome and the valving surface moves rapidly into engagement with the valve seat to block flow through the valve.

Preferably, and in accordance with a more limited aspect of the invention, the valving surface is defined by a radial shoulder that defines the junction between the first and second portions of the valve chamber and has a conical configuration. In addition, the flow passages are preferably rectangular slots which extend circumferentially of the hollow cylindrical body at a location closely adjacent the valving surface. Also, the coil spring is preferably arranged to engage an internal circumferential Ledge within the hollow cylindrical portion at a location intermediate the flow passages and the open end. Thus, flow through the valve passes through the flow passages and centrally of the coil spring.

In its preferred form, the valve body is formed of two threadedly connected sections which respectively define the first and second sections of the valve chamber with the end of one of the sections defining the valve seat.

Because of the relationship between the coil spring, the poppet element, and the smaller diameter section of the valve chamber, a smooth guiding action is achieved and there is no possibility of binding or cocking of the valve element during its movement to the closed position. Additionally, during normal flow through the valve, the fluid dynamic forces acting on the poppet are significantly less than the opposing force of the spring making the valve stable. However, the slots or holes in the poppet are preferably designed to be smaller than the upstream flow areas. This concentrates most of the pressure drop at the slots. The pressure drop through the slots acts on the diameter of the poppet. The force acting against the spring is thus the pressure drop times the area of the poppet diameter. Because the slots are adjacent to the seating surface, any movement of the poppet reduces the slot area to produce an increase in pressure drop and rapid closing movement of the poppet. More importantly, however, there is produced a sharp, distinct, repeatable trip point flow rate.

As can be seen from the foregoing, a primary object of the invention is the provision of a poppet-type excess flow valve wherein there is a distinct, repeatable trip point and in which the poppet element moves to its closed position with a snap action and is guided in the movement by the cooperation of the compression spring and the valve chamber.

A still further object of the invention is the provision of a flow control valve of the type described which is simple in construction and highly reliable in operation.

Another object is the provision of an excess flow control valve which can be arranged to close at a variety of different flow rates.

Yet another object is the provision of a valve of the type described that is extremely stable and not prone to chatter.

BRIEF DESCRIPTION OF THE DRAWINGS

The above and other objects and advantages will become apparent from the following description when read in conjunction with the accompanying drawings wherein:

FIG. 1 is a longitudinal cross-sectional view through an excess flow valve formed in accordance with the invention;

FIG. 2 is a perspective view of the poppet element; and,

FIG. 3 is a partial cross-sectional view showing the poppet element in the closed position resulting from excess flow conditions.

DETAILED DESCRIPTION OF THE PREFERRED EMBODIMENT

Referring more particularly to the drawings wherein the showings are for the purpose of illustrating a preferred embodiment of the invention only and not for the purpose of limiting same, FIG. 1 shows the overall arrangement of the excess flow valve 10 as comprising a body 12 formed of a first component 14 and a second component 16. The two body components 14 and 16 are formed from any suitable material, preferably a metal such as stainless steel. Body component 14 is shown as including an inlet port 18 and an internal counterbore 20 which defines a first large diameter section of an internal valve chamber 22. The body component 16 is, as seen, threadedly connected to body component 14 by external threads 24 that mate with internal threads 26 formed within the counterbore 20 as shown.

Body component 16 defines an outlet port 28 and an axially aligned internal counterbore 30 that cooperates with the counterbore 20 of component 14 to define the generally cylindrical internal valve chamber 22. As shown, the counterbore section 30 is of smaller diameter than counterbore section 20 and terminates in a flat end wall 32 which surrounds the outlet port 28. Component 16, like component 14, can be formed of any suitable material, preferably a metal such as stainless steel.

Positioned between the components 14 and 16 to provide a suitable fluid seal is a circumferentially extending O-ring 36 and a relatively rigid backup ring The particular material used to form the O-ring and the backup ring is not of importance to the invention and the O-ring could be any suitable elastomer having the necessary characteristics desired depending upon the fluid to be handled by the valve. Although not shown, it should be understood also that the body components 14 and 16 can be provided on their exterior with suitable tool receiving surfaces, such as wrench flats, to allow ready assembly and disassembly of the two components. It should also be understood that although the ends of the body sections 14 and 16 which surround the inlet and outlet ports 18 and are shown as having external threads and a camming mouth for receiving well known types of ferrule fittings for connecting the valve to the system tubing or piping, it could be provided with any known type of end fittings or connection and these form no part of the invention.

As can be seen, the inlet port 18, the outlet port 28, and the valve chamber 22 are in axial alignment. Positioned within the valve chamber is the uniquely arranged poppet element 40 which is also shown in greater detail in FIG. 2. As illustrated, the poppet element 40 has a generally cylindrical overall configuration and includes a first section 42 in the form of a hollow cylindrical body which is sized so as to be closely but slidably receivable in the counterbore 30 which defines the second section of the valve chamber 22. The section 42 has a relatively thin wall throughout most of its axial extent. The thin walled portion terminates in a somewhat thicker walled portion and defines an internal ledge 44. The poppet further includes a second section which generally comprises a transversely extending end wall 46 that extends radially outward from the center axis a distance beyond the radial extent of the counterbore 30. The transition between the larger diameter end wall 46 and the hollow cylindrical sleeve-like body portion 42 has a truncated conical configuration and defines a circumferentially continuous valving surface 48. Also, associated with the end wall 46 are a plurality of spacer legs 50 that extend axially outward from the end wall and are sized and located such that they can engage the end wall of counterbore 20 about the inlet port 18.

Flow passages in the form of generally rectangular slots 52 are formed through the cylindrical body portion 42 at a location closely adjacent the valving surface 48. The size and arrangement of the slots 52 will subsequently be described.

In normal flow conditions, the poppet valve element 40 is biased to the position shown in FIG. 1 by a cylindrical coil spring 54. As illustrated, the coil spring 54 has a maximum outer diameter which is only slightly less than the internal diameter of the end portion of the thin walled section of the cylindrical body portion 42. The left-hand end (as viewed in FIG. 1) of the spring 54 bears against the internal circumferential ledge 44. The opposite end of spring 54 has the final coil formed with a diameter substantially as large as the diameter of the counterbore 30 in body component 16. This maintains the poppet element 40 continually biased to the location shown in FIG. 1 during normal flow conditions. Flow can normally take place through the valve and around the poppet between the legs 50 and through the slots 52 and centrally through the spring 54 to the outlet 28. The flow areas across the face of end wall 46 of the poppet past the legs 50 and through the annular area about the poppet end are all equal to or generally greater than the flow area of the inlet passage and the outlet passage. Therefore, the pressure drop around the poppet is low and creates a force on the poppet that is small compared to the spring force. This assures that the poppet is static and does not move and cannot chatter up to the trip point. The pressure drop across the poppet slots acts on the diameter area of the poppet to trip the valve. This diameter is larger than the flow areas since it surrounds the spring, the inside of which is at least the diameter of the flow area. Thus, the pressure drop across the slots can be small and can still overcome the spring force by acting on a large area. Therefore, the valve causes a minimal restriction to normal flow up to the trip point.

The design of the valve poppet and the internal arrangement of the valve is such that the largest restriction to flow is at the flow openings defined by the slots 52. This means that the fluid volume in front of or at the left entrance end of the poppet and in the annular area between the poppet and the counterbore 20 will be under a higher pressure than the fluid within the poppet section 42. Consequently, a resultant force acts primarily against the poppet nose or the left-hand side of the end wall 46 that is parallel to the valve axis. During normal flow through the valve, this resultant force is significantly over-balanced by the opposing force of the spring. However, as flow through the valve increases above a predetermined maximum, the fluid force acting against the nose of the poppet becomes sufficient to overcome the compression force of the spring causing the poppet element to move to the right. As the poppet moves to the right, the slots 52 begin to move under the end of the counterbore 30. Because the flow opening or slots are positioned immediately adjacent to the valving surface and the corresponding valve seat defined by the end of body component 16, the effective orifice size of the slots 52 decreases causing an increased pressure drop across the slots. This produces a self-energizing, rapid closing movement of the poppet much in the nature of a snap action. The poppet seal surface 48 seats against the seat area and reduces flow to substantially zero. However, because there are no elastomers in the seat or the sealing surface, a positive total shutoff is not made and a small leakage flow occurs between the poppet and the body component 16. This allows the valve to reset without a flow bypass or manual override. Closure of either an upstream or downstream control valve allows the upstream pressure in the valve to slowly equalize with the downstream pressure. Once the pressure drops enough so that spring force cannot be overcome, the poppet is forced open and the valve is reset. To assure a predetermined small flow through the valve, a laser etched groove or slot is also formed in the seat or the poppet valving area to assure that a minor reset flow can take place even when the valve is in the closed position. Additionally, however, an opening of predetermined size could be placed through the end wall to produce a desired minimum flow or increase the speed of reset.

It should, of course, be understood that sizing of the spring relative to the flow area depends upon the pressures and maximum fluid flow permissible in a particular system. Industry practice dictates that such a limit is based on limiting the velocity of fluid through the system tubing and the internal size of the tubing. Each size of the excess flow valve is intended to trip near these limits with further modification of the valve's trip point made possible by varying the spring force. Further modification of the trip point is possible by regulating the flow hole size. Such variations can be readily determined by those skilled in the art to achieve a desired trip point.

As can be seen from the foregoing, the relationship between the poppet element, the valve body components, and the spring is such as to assure smooth guiding movement of the poppet between the normally open and the tripped or closed position.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A poppet type excess flow valve comprising:

a) a body forming a valve chamber having a first end defining an inlet port and a second end defining an outlet port, the valve chamber having a first portion of a first diameter adjacent the first end and a second portion of a second diameter adjacent the second end, the second diameter being smaller than the first diameter;

b) a valve seat between the first and second portions of the valve chamber, the valve seat formed by a radially extending shoulder defining the junction between the first and second portions of the valve chamber;

c) a poppet element in the valve chamber, the poppet element including a first section in the form of a hollow cylindrical body extending into the second portion of the valve chamber and terminating therein in an open end, the outer diameter of the hollow cylindrical body section being only slightly less than the diameter of the second portion of the valve chamber for guided sliding movement therein, the poppet element further including a second section located in the first portion of the valve chamber and joined to the first section, the second section including an end wall carrying a circumferentially continuous valving surface extending radially outward to a diameter greater than the diameter of the second portion of the valve chamber for cooperation with the valve seat;

d) a compression coil spring means received in the first section of the poppet element and extending out of the open end into engagement with the body about the outlet port for maintaining the poppet element continually biased under a predetermined force toward the inlet port; and, e) flow passages formed through the hollow cylindrical body portion of the poppet element at a location closely adjacent the valving surface of the second section.

2. The valve as defined in claim 1 wherein the compression coil spring means has a generally cylindrical configuration sized to be closely received in the interior of the hollow cylindrical body portion of the poppet element.

3. The valve as defined in claim 1 wherein the poppet element includes a circumferential ledge in the hollow cylindrical portion at a location axially between the flow passages and the open end, and wherein the coil spring means has an end that engages the ledge.

4. The valve as defined in claim 1 wherein the flow passages in the poppet element comprise rectangular slots.

5. The valve as defined in claim 1 wherein the poppet element includes a plurality of leg means extending from the end wall of the second section to prevent the end wall from engaging the body about the inlet port.

6. The valve as defined in claim 1 wherein the end wall of the poppet element is imperforate and the valving surface is of conical configuration.

7. The valve as defined in claim 6 wherein the valving surface is provided with a bleed groove to permit a predetermined minimum flow through the valve surface when the poppet element is engaged with the valve seat.

8. The valve as defined in claim 7 wherein the flow passages in the poppet element are slots extending circumferentially and parallel to the end wall.

9. A poppet type excess flow valve comprising:

a) a body formed by two axially connected body components defining a valve chamber having a first end with an inlet port and a second end with an outlet port, the valve chamber being generally cylindrical and having a first portion of a first diameter adjacent the first end defined by one of the components and a second portion of a smaller second diameter adjacent the second end defined by the second of the components;

b) a valve seat formed by a radially extending shoulder defining the junction between the two body components;

c) a poppet element in the valve chamber and including a first section in the form of a hollow cylindrical body extending into the second portion of the valve chamber and terminating therein in an open end, the outer diameter of the hollow cylindrical body section being only slightly less than the diameter of the second portion of the valve chamber for guided sliding movement therein, the poppet element further including an end wall in the first portion of the valve chamber and carrying a circumferentially continuous valving surface extending radially outward to a diameter greater than the diameter of the second portion of the valve chamber for cooperation with the valve seat;

d) a compression coil spring means received in the first section of the poppet element and extending out of the open end into engagement about the outlet port for maintaining the poppet element continually biased under a predetermined force toward the inlet port; and, e) flow passages formed through the hollow cylindrical body portion of the poppet element at a location closely adjacent the valving surface, the size of the flow passages related to the predetermined force of the coil spring means to permit a predetermined maximum flow through the valve after which the force of the coil spring means is overcome and the valving surface moves into engagement with the valve seat.

10. The valve as defined in claim 9 wherein the two body components are threadedly connected and the valving surface has a conical configuration and engages the seat with line contact.

11. The valve as defined in claim 9 wherein the poppet element includes a circumferential stop surface formed about the interior of the hollow cylindrical body section at a location axially between the flow passages and the open end, and an end of coil spring means engaged with the stop surface.

12. The valve as defined in claim 11 wherein the inlet port, the outlet port, and the valve chamber are in axial alignment.

13. A fluid flow responsive device comprising:

a) a body forming a chamber having a first end defining an inlet port and a second end defining an outlet port, the chamber having a first portion of a first diameter adjacent the first end and a second portion of a second diameter adjacent the second end, the second diameter being smaller than the first diameter;

b) a valve seat between the first and second portions of the chamber, the valve seat formed by a radially extending shoulder;

c) a poppet element in the valve chamber, the poppet element including a first section in the form of a hollow cylindrical body extending into the second portion of the chamber and terminating therein in an open end, the outer diameter of the hollow cylindrical body section being only slightly less than the diameter of the second portion of the chamber for guided sliding movement therein, the poppet element further including a second section located in the first portion of the chamber and joined to the first section, the second section including a circumferentially continuous valving surface extending radially outward for cooperation with the valve seat;

d) a compression spring means received in the first section of the poppet element and extending out of the open end into engagement with the body for maintaining the poppet element continually biased under a predetermined force toward the inlet port; and, e) flow passages formed through the hollow cylindrical body portion of the poppet element at a location closely adjacent the valving surface of the second section.

14. The device as defined in claim 13 wherein the compression spring means has a generally cylindrical configuration sized to be closely received in the interior of the hollow cylindrical body portion of the poppet element.

15. The device as defined in claim 13 wherein the flow passages in the poppet element comprise rectangular slots.

* * * * *